United States Patent [19]
West et al.

[11] 3,801,867
[45] Apr. 2, 1974

[54] DIRECT CURRENT ENERGIZATION OF GASEOUS DISCHARGE

[75] Inventors: Thomas G. West; James R. Collins, both of Fort Wayne, Ind.; Thomas J. Broski, Hendersonville, N.C.

[73] Assignee: General Electric Company, Indianapolis, Ind.

[22] Filed: Nov. 1, 1972

[21] Appl. No.: 302,793

[52] U.S. Cl.... 315/241 R, 315/DIG. 5, 315/DIG. 7, 315/311
[51] Int. Cl. .......................................... H05b 37/02
[58] Field of Search...... 315/DIG. 5, DIG. 7, 241 R, 315/227 R, 307, 311

[56] References Cited
UNITED STATES PATENTS

| | | | |
|---|---|---|---|
| 3,471,747 | 10/1969 | Gershen | 315/DIG. 7 |
| 3,066,241 | 11/1962 | Palmer | 315/307 X |
| 3,462,643 | 8/1969 | Turner et al. | 315/DIG. 5 UX |
| 3,619,713 | 11/1971 | Biega et al. | 315/DIG. 7 X |
| 3,675,078 | 7/1972 | Levy | 315/DIG. 5 X |
| 3,731,182 | 5/1973 | Hirono | 315/307 X |

*Primary Examiner*—Herman Karl Saalbach
*Assistant Examiner*—James B. Mullins

[57] ABSTRACT

There is provided a solid-state circuit for starting and regulating a gaseous discharge lamp which is operated by direct current. An input transformer connected to a full wave rectifier and smoothing filter provides direct current for lamp operation. A series arrangement including a controlled rectifier (SCR) and a capacitor is connected across this DC power supply and the lamp. A charge path is provided for the capacitor through a pair of resistors and an autotransformer primary winding. A separate actuation means is provided to gate on the SCR. When the SCR is gated on the capacitor discharges back through the primary winding inducing a voltage in a secondary winding causing the lamp to start. A transistor has its collector and emitter connected in series with the DC power supply and the lamp to provide regulation or ballasting of the lamp. The base of the transistor is connected to the actuation means. A Zener diode is connected in a circuit arrangement with the transistor to provide a constant voltage. A variable resistor is connected to the transistor and to the Zener diode and utilizes a portion of this constant voltage to bias the base-emitter junction of the transistor.

15 Claims, 7 Drawing Figures

DIRECT CURRENT ENERGIZATION OF GASEOUS DISCHARGE

BACKGROUND OF THE INVENTION

This invention relates to an improved electronic ballast circuit used for gaseous discharge lamps operating on a DC voltage. More particularly it relates to a means for starting and regulating the current in a gaseous discharge lamp operating on a DC voltage. Because most gaseous discharge lamps have negative resistance characteristics, it is necessary to control or ballast the current through the lamps to prevent lamp destruction. Most present day ballast circuits utilize inductors and capacitors to provide an impedance for an AC current through gaseous discharge lamps such as fluorescent lamps. However, when it is desired to use direct current power for the lamp these capacitors and inductors are of no use in the ballasting operation. The need for direct current operation of a lamp arises in the photocopying art when the need for a constant amplitude light output, free of line frequency ripple variation, and/or fast transition flashing duty is required. In the past DC ballasting has been achieved with a resistor in series with a DC voltage supply and a switch. The DC supply had sufficient amplitude to start the lamp at the closure of the switch. Using this method a voltage significantly greater than the typical operating lamp voltage, typically 5 to 10 times, needs to be supplied for reliable starting. Furthermore, the ballast resistor dissipated a large amount of energy which was greater than that dissipated by the lamp. The circuit was very inefficient and lamp current regulation was poor.

Another past DC ballasting approach utilized a resistor wound on a magnetic core structure so as to have a relatively high inductance. This resistor is placed in series with the lamp and the DC supply. A switch is placed in parallel to the lamp so that in the closed state the lamp is off and short circuit current is drawn through the inductor-resistor. To start and ballast the lamp the parallel switch is opened, momentarily interrupting the inductor-resistor current which upon collapse of its magnetic field induces a voltage sufficient to start the lamp. The resistor-inductor would act to ballast lamp current and smooth lamp current ripple.

There is a need to operate gaseous discharge lamps utilizing an efficient DC ballasting technique especially where good lamp current regulation is important, e.g., in the photo-copying art. Furthermore, where low voltages are available and resistive ballasting is not desirable another means of lamp starting, such as pulse starting, is needed.

SUMMARY OF THE INVENTION

Accordingly, it is a general object of this invention to provide an improved solid-state starting and ballasting circuit for a gaseous discharge lamp operating from DC.

Another object of this invention is to provide a solid-state ballast capable of a high degree of regulation of the current in a gaseous discharge lamp operating from DC.

Another object of this invention is to provide a DC operated solid-state ballast where the DC supply need only be slightly greater than the operating lamp voltage.

Another object of this invention is to provide a DC solid-state ballast where the starting characteristic load line is improved resulting in reliable starting and improved lamp life.

Another object of this invention is to provide solid-state starting and regulation of a gaseous discharge lamp operating from a DC power source and utilizing a separate actuation means to control the starting and regulation.

Another object of this invention is to provide a DC ballast and starting circuit having superior efficiency, reliability, improved starting characteristics and design flexibility.

In accordance with one form of the present invention there is provided a DC power source for operating a gaseous discharge lamp. A means for starting the lamp is connected across the lamp and includes a controlled rectifier (SCR), a capacitor which discharges through the SCR when the SCR is energized, and an autotransformer having a primary winding which serves as a discharge path for the capacitor. A voltage is induced into the secondary of the autotransformer by the capacitor discharge and this voltage starts the lamp. A current regulation means is connected in series with the gaseous discharge lamp and the source of DC power. This regulation means includes a transistor which acts as a variable impedance depending on the bias on its base-emitter junction and a bias circuit. The bias circuit includes a Zener diode and a resistor connected to the emitter of the transistor in voltage opposition with the Zener diode so that as the current through the transistor increases its base-emitter bias decreases. An actuation means is connected to the gate of the SCR and to the regulation means. This actuation means provides a gating pulse for the SCR which in turn starts the lamp, and a bias means for the transistor to control and limit lamp current.

BRIEF DESCRIPTION OF THE DRAWINGS

The subject matter which is regarded as the invention is set forth in the appended claims. The invention itself, however, together with further objects and advantages thereof may be better understood by reference to the following description taken in conjunction with the accompanying drawings in which:

DESCRIPTION OF THE PREFERRED EMBODIMENTS

Figure 1:
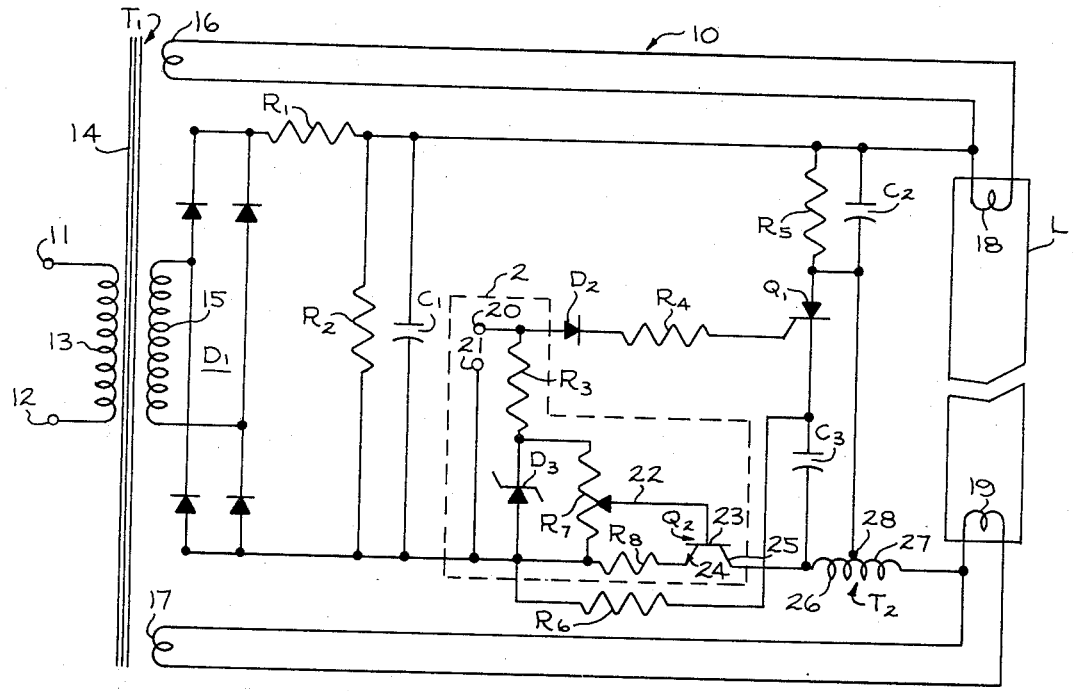
FIG. 1 is a schematic circuit diagram of one embodiment of the ballast circuit using one form of biasing for the regulation means.

Referring more particularly to FIG. 1, the improved solid-state starting and ballast circuit for a DC operated gaseous discharge lamp comprises a source of DC power, a circuit for regulating the current through the lamp controlled by a separate low voltage DC signal, and a circuit for starting the lamp controlled by the same low voltage DC signal. Transformer $T_1$, which includes primary winding 13, secondary windings 15, 16, and 17, and core 14, receives an AC input voltage across terminals 11 and 12. Secondary winding 15 serves to transform that voltage. Secondary windings 16 and 17 are connected respectively to heating cathodes 18 and 19 and provide energy for gas excitation in lamp L. Secondary winding 15 is connected to a full wave rectifier bridge $D_1$. Resistors $R_1$, $R_2$ and capacitor $C_1$ are connected in circuit across rectifier bridge $D_1$ and serve as a ripple filter to provide smoothed DC for lamp L. Resistor $R_1$ also is connected between the diode bridge $D_1$ and capacitor $C_1$ to serve as a current limiting resistor. Capacitor $C_2$ is connected between resistor $R_1$ and the junction point 28 which lies between primary winding 26 and secondary winding 27 of autotransformer $T_2$ and prevents a destructive voltage pulse from appearing across transistor $Q_2$. SCR $Q_1$, capacitor $C_3$, and the primary winding 26 of transformer $T_2$ are connected in a series loop to provide starting pulses for lamp L. Resistor $R_5$ is connected to the positive side of diode bridge $D_1$ through resistor $R_1$ and to autotransformer $T_2$ at junction point 28. Resistor $R_6$ is connected to capacitor $C_3$ and the negative side of the bridge. These two resistors control the charging of capacitor $C_3$.

Diode $D_2$ and resistor $R_4$ are connected in series and to the gate of SCR $Q_1$ which receives a gating signal from low level DC input terminal 20. When SCR $Q_1$ comes on, capacitor $C_3$ discharges through primary 26 which induces voltage in secondary 27 to start lamp L. Regulation and actuation means are included in block 2 which includes transistor $Q_2$. This transistor is connected in series with the negative side of diode bridge $D_1$ and transformer $T_2$. Transistor $Q_2$ serves as a solid-state ballast since it regulates the current flowing through lamp L. The impedance of the transistor is controlled by the bias level on its base-emitter junction. To this end resistor $R_3$ and Zener diode $D_3$ are connected in series between the low voltage DC input terminal 20 and the rectifier bridge $D_1$. A potentiometer $R_7$, which is used as a variable resistance, is connected in parallel with Zener diode $D_3$ and the potentiometer wiper 22 is connected to the base 23 of transistor $Q_2$. A portion of the voltage appearing across the Zener diode $D_3$ is derived from potentiometer $R_7$ for application to the base of transistor $Q_2$ thereby maintaining transistor $Q_2$ in conduction after the starting of lamp L. This base voltage derived from potentiometer $R_7$ is connected in opposition with the voltage developed across sensing resistor $R_8$ thereby providing a variable signal to the base of transistor $Q_2$ whereby transistor $Q_2$ functions as a regulator.

The operation of the starting and ballast circuit is as follows: An AC input is received across input terminals 11, 12 of primary winding 13. Secondary windings 16 and 17 are energized and provide heating power for the lamp cathodes 18 and 19. Secondary winding 15 transforms the AC voltage input. Full wave diode bridge $D_1$ provides full wave DC output. Resistor $R_2$ and capacitor $C_1$ which are connected across the diode bridge $D_1$ provide a smoothing filter operation for proper DC operation of lamp L. Capacitor $C_3$ is charged through resistors $R_5$ and $R_6$ and primary winding 26. The lamp is started by the application of a DC voltage across terminals 20 and 21 which applies a positive voltage to the gate terminal of SCR $Q_1$. When SCR $Q_1$ comes on the capacitor $C_3$ is discharged through the loop comprising SCR $Q_1$ and winding 26. This produces a starting pulse in secondary winding 27 which is applied across lamp L sufficient for starting the lamp. When lamp L comes on a current flows from rectifier bridge $D_1$ through resistor $R_1$ through the lamp and through transformer $T_2$, transistor $Q_2$, resistor $R_8$ back to the negative side of the diode bridge $D_1$. Since the current is DC, transformer $T_2$ has very little effect on the ballasting of lamp L and transistor $Q_2$ serves as the ballast for lamp L. The amount of current through transistor $Q_2$ is determined by the regulation circuit which comprises resistor $R_3$, potentiometer $R_7$, resistor $R_8$ and Zener diode $D_3$. Zener diode $D_3$ sets a constant voltage across potentiometer $R_7$. The base-emitter bias of transistor $Q_2$ is then determined by the potentiometer $R_7$ and sensing resistor $R_8$. Potentiometer $R_7$ applies a part of the Zener voltage to the base of transistor $Q_2$ but because the voltage across potentiometer $R_7$ is in opposition to the voltage developed across sensing resistor $R_8$ by the lamp current a variable voltage is applied to the base of transistor $Q_2$ and regulation of lamp current is achieved. Hence the light output of the lamp is ballasted and regulated. Transistor $Q_2$ turns off where there is no voltage across terminals 20 and 21 and then the lamp turns off.

Figure 7:
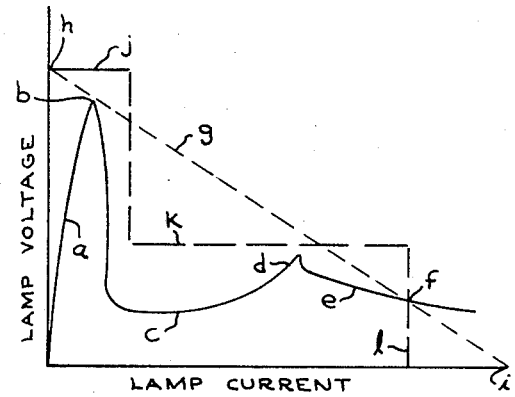
FIG. 7 is a superimposed graph of the waveforms showing the operating characteristics of a typical gaseous discharge lamp and also the load line using a resistive and the improved ballasting techniques.

In order to more fully understand the operation of the circuit FIG. 7 has been provided. FIG. 7 consists of (3) three superimposed curves ultizing a fluorescent lamp as an example although other lamp loads may be used: a representative simplified fluorescent lamp volt-ampere characteristic consisting of segments and points (a) through (f), straight line segment (g) a resistive ballast load line, and the load line of the subject circuit invention in segments (j) through (l). The purpose of this diagram is to show how pulse voltage (j) of the invention can be independently varied from segments (k) and (l) and can in fact be made very high in order to insure positive starting without sacrifice to efficiency. The horizontal segment (K) represents the compliance voltage of the DC supply. Note how much lower it is than that of the resistor ballast at point (h). It is important to reliable, long-life flashing operation that any load line circumvent point (d) to the right and above. This is to prevent latch up into operation of the circuit in the segment (c) characteristic of the lamp. Rapid cathode destruction will ensue in flashing duty if such a condition exists, if only momentarily. Point (f) is the operating point. Vertical segment (l) represents the constant current regulating line of the subject invention. Unlike line (g) the position of this line does not vary with voltage source input variations. The subject invention load line ideally avoids crossing below point (d) with little sacrifice to efficiency compared with the case of load line (g).

Figure 2:
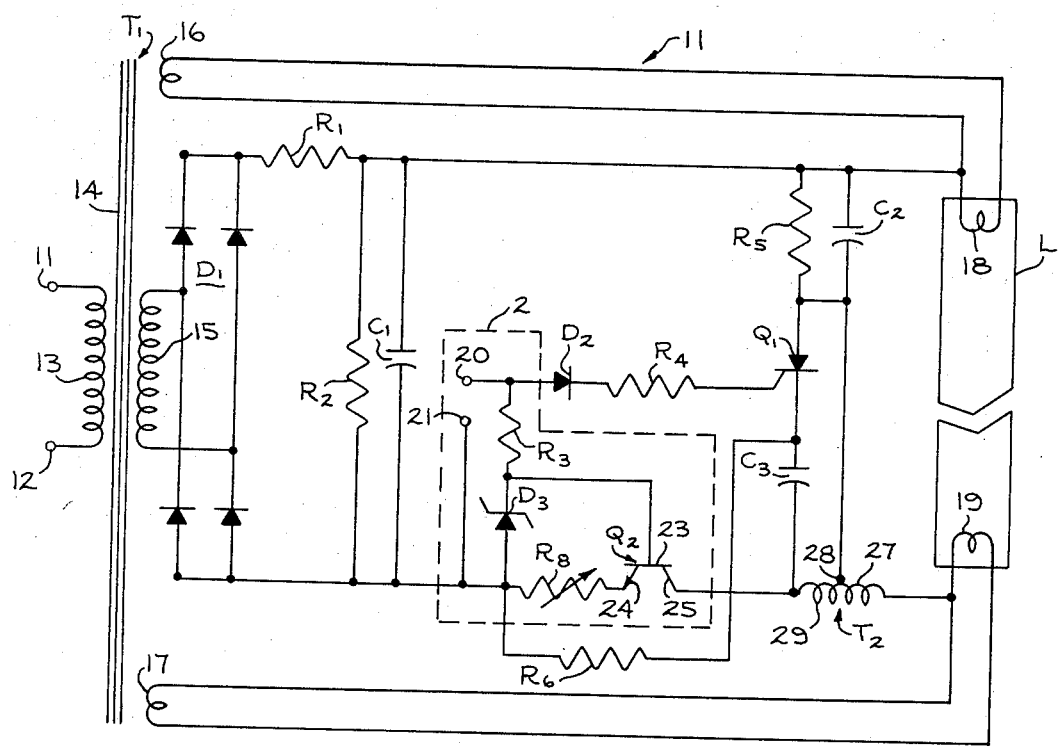
FIG. 2 is a schematic circuit diagram of another embodiment of the ballast circuit utilizing another form of biasing for the regulation means.

Referring now to FIG. 2, FIG. 2 shows substantially the same circuit as that of FIG. 1 except that the regulation circuit is slightly different. Zener diode $D_3$ is connected directly to the base of transistor $Q_2$ and to variable resistor $R_8$. Variable resistor $R_8$ is connected to the emitter transistor $Q_2$. In this embodiment the Zener voltage drop remains constant but the sensing resistor $R_8$ is made variable. Regulation of lamp current is achieved by maintaining a constant voltage drop across variable resistor $R_8$.

Figure 3:
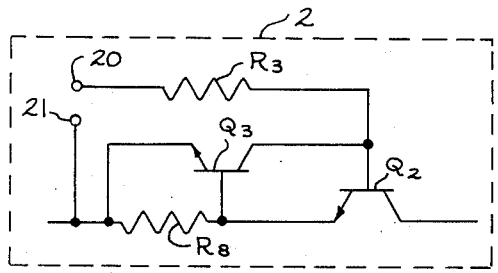
FIG. 3 is a schematic circuit diagram of another embodiment of the regulation means for the ballast.

FIG. 3 shows an alternative embodiment of the regulation circuit 2. Transistor $Q_3$ has its collector connected to the base of transistor $Q_2$ and its base connected to the emitter of transistor $Q_2$, and one side of variable resistor $R_8$. The emitter of transistor $Q_3$ is connected to the other side of variable resistor $R_8$. As the current through transistor $Q_2$ increases the base-emitter junction of transistor $Q_3$ becomes more forward biased because of the increased voltage drop across variable resistor $R_8$. This causes an increase in collector current through transistor $Q_3$. A greater portion of the current from input terminal 20 is directed away from the base of transistor $Q_2$ which causes transistor $Q_2$ to conduct proportionately less current thereby achieving a current regulating effect in transistor Q.

Figure 4:
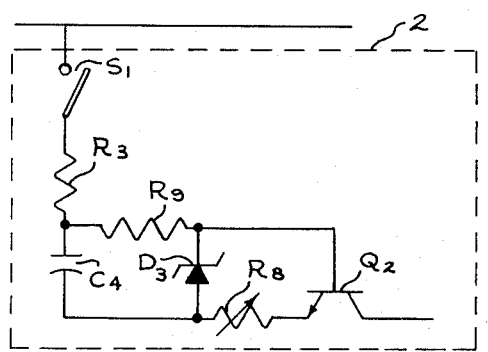
FIG. 4 is a schematic circuit diagram of another embodiment of the regulation means for the ballast.

FIG. 4 shows a similar arrangement to that in FIG. 2 except timing capacitor $C_4$ is connected in parallel with Zener diode $D_3$ and the means for activating the regulator is by switch $S_1$. Switch $S_1$ is connected to source of DC which provides lamp current rather than utilizing an independent DC source.

Figure 5:
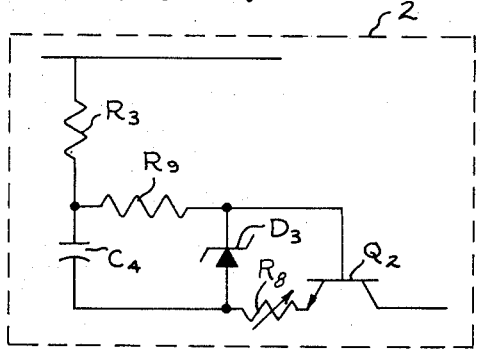
FIG. 5 is a schematic circuit diagram of still another embodiment of the regulation means for the ballast.

FIG. 5 shows substantially the same regulator as FIG. 4 except that no switch or independent actuation means is used for the regulator.

Figure 6:
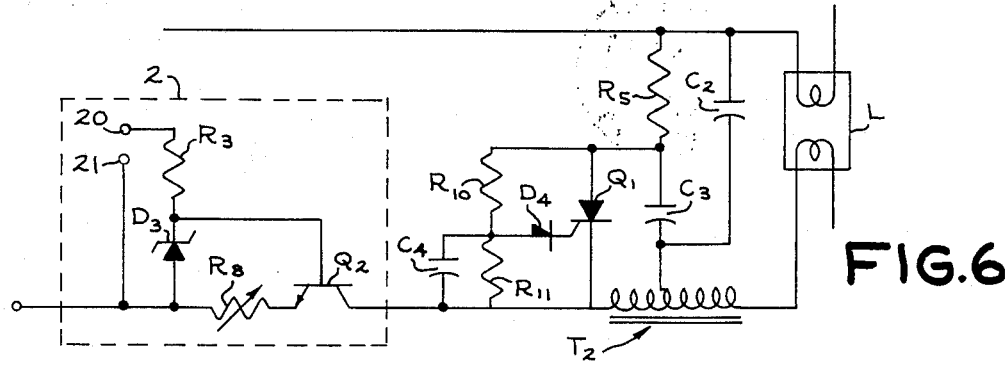
FIG. 6 is a schematic circuit diagram of another embodiment of the ballast circuit utilizing separate starting and regulating voltage sources.

FIG. 6 is similar to FIG. 2 insofar the regulator is concerned but the starting circuit is a self-starting type, i.e. the independent DC voltage source across terminals 20 and 21 is not used for starting. Resistor $R_{10}$ is connected to resistor $R_5$ and capacitor $C_4$ to provide a charging path for capacitor $C_4$. Resistor $R_{11}$ is connected across capacitor $C_4$. Breakdown device $D_4$ is connected to the gate of SCR $Q_1$ and to capacitor $C_4$. Capacitor $C_3$, again, provides current for pulse starting the lamp. Resistor $R_{11}$ is proportioned with resistor $R_{10}$ to provide a minimum voltage equal to the breakdown voltage of breakdown device $D_4$. When the charge on capacitor $C_4$ reaches the threshold voltage of breakdown device $D_4$, SCR $Q_2$ comes on and capacitor $C_3$ discharges through SCR $Q_1$ and transformer $T_2$. Capacitor $C_4$ takes longer to charge than capacitor $C_3$ thus assuring that capacitor $C_3$ is fully charge before it is discharged further assuring sufficient starting voltage for the lamp.

A circuit as set forth in FIG. 1 has been built and operated with components having the following values:

Diodes in bridge $D_1$ — (1A, 200V)
Diode $D_2$ — (1A, 200V)
Zener diode $D_3$ — (5.6V, ½ Watt)
SCR $Q_1$ — (7A, 200V)
Transistor $Q_2$ — (3.5A, 200V)
Transformer $T_1$ — primary 13 – 625 turns
Transformer $T_1$ — secondary 15 – 499 turns
Transformer $T_1$ — secondary 16 – 23 turns
Transformer $T_1$ — secondary 17 – 23 turns
Autotransformer $T_2$ — primary 26 – 20 turns
Autotransformer $T_2$ — secondary 27 – 525 turns
Resistor $R_1$ — 5 ohms, 5 watt wirewound
Resistor $R_2$ — 100 kilohms, ½ watt carbon composition
Resistor $R_3$ — 470 ohms, 2 watt carbon composition
Resistor $R_4$ — 470 ohms, ½ watt carbon composition
Resistor $R_5$ — 100 kilohms, ½ watt carbon composition
Resistor $R_6$ — 47 kilohms, ½ watt carbon composition
Resistor $R_7$ — 1000 ohms, 3 watt wirewound
Resistor $R_8$ — 15 ohms, 2 watts wirewound
Capacitor $C_1$ — 100 microfarads, 150V aluminum electrolytic
Capacitor $C_2$ — .01 microfarads, 1KV ceramic
Capacitor $C_3$ — .33 microfarads, 200V film-extended foil From the foregoing description of the various embodiments of the invention it will be apparent that many modifications may be made therein. It will be understood, however, that these embodiments of the invention are intended as exemplifications of the invention only and that the invention is not limited thereto. For example, diode bridge $D_1$ is not necessary if the input is connected to a DC source. It is to be understood, therefore, that it is intended in the appended claims to cover all such modifications as fall within the true spirit and scope of the invention.

What is claimed as new and desire to secure by letters Patent of the United States is:

1. A circuit for operating at least one gaseous discharge lamp comprising: input means for applying a D.C. voltage across the lamp;
   starting means for applying a starting pulse to the lamp;
   solid state ballasting means having a pair of conduction electrodes and a control electrode for regulating the current through the lamp;
   current sensing means connected to one of said conduction electrodes for applying a bias signal to said one of said conduction electrodes and to said control electrode;
   actuation means for applying a D.C. control signal to said starting means and said ballasting means, the D.C. control signal being independent of said input means.

2. A circuit as set forth in claim 1 wherein said ballasting means includes a transistor with its emitter-collector path connected in series with said input means and the lamp, and a control means, the base of said transistor connected to said control means.

3. A circuit as set forth in claim 2 further including constant voltage means to provide a preselected bias at the base-emitter junction of said transistor, said current sensing means including a dropping resistor connected between said emitter of said transistor and said constant voltage means whereby regulation of the lamp is achieved.

4. A circuit as set forth in claim 2 further including a constant voltage means, a potentiometer connected across said constant voltage means, the wiper of said potentiometer connected to the base of said transistor.

5. A circuit as set forth in claim 4 further including a resistor connected between said emitter of said transistor and said potentiometer.

6. A circuit as set forth in claim 2 including a constant voltage means connected to the base of said transistor, and a variable resistor connected between said emitter of said transistor and said constant voltage means whereby regulation of the lamp is achieved.

7. A circuit as set forth in claim 1 wherein said starting means includes:
a capacitor;
a thyristor connected between said input means and said capacitor;
and a pulse transformer connected to said thyristor, said capacitor, and the lamp.

8. A circuit for operating at least one gaseous discharge lamp comprising input means for connecting the circuit to a source of input voltage, said input means including a transformer, a full wave rectifier connected to said transformer, a smoothing filter connected across said full wave rectifier;
starting means including a capacitor, a thyristor connected to said capacitor and said input means, and a pulsed transformer connected to said thyristor, said capacitor and the lamp;
regulating means including a transistor having its emitter and collector connected in series with said input means of the lamp, constant voltage means to provide a pre-selected bias at the base-emitter junction of said transistor, and a resistor connected between said emitter of said transistor and said constant voltage means;
actuation means for applying a D.C. signal to the gate of said thyristor and to the base of said transistor, the D.C. signal being independent of the source of input voltage.

9. A circuit for operating at least one gaseous discharge lamp comprising: input means for applying a D.C. voltage across the lamp;
starting means including a solid state device for pulse starting the lamp connected to said input means;
solid state ballasting means connected between said input means and the lamp;
said solid state ballasting means having a pair of conduction electrodes and a control electrode;
current sensing means connected to one of said conduction electrodes for applying a bias signal to said one of said conduction electrodes and to said control electrode;
actuation means connected to said ballast means for regulating the current through the lamp.

10. A circuit as set forth in claim 9 wherein the DC voltage is of an insufficient magnitude to start the lamp.

11. A circuit as set forth in claim 9 wherein said starting means includes: a thyristor having anode, cathode, and gate electrodes; a first capacitor connected to said anode electrode; a pulse transformer connected to said cathode and said first capacitor; a second capacitor connected to said gate electrode, said second capacitor having a longer charge time than said first capacitor.

12. A circuit as set forth in claim 9 wherein said ballasting means includes a transistor having base, emitter, and collector electrodes.

13. A circuit as set forth in claim 12 wherein said transistor has its emitter and collector connected in series with the lamp and said input means; said control means includes a second transistor having base, emitter, and collector electrodes; said collector a said second transistor connected to said base of said transistor, and said base of said second transistor connected to said emitter of said transistor; a resistance connected between said base and said emitter of said second transistor.

14. A circuit as set forth in claim 12 wherein said base of said transistor is connected to said input means; a Zener diode is connected to said base of said transistor; a resistance is connected between said emitter of said transistor and said Zener diode.

15. A circuit as set forth in claim 14 further including a switch means connected between said input means and said base of said transistor.

* * * * *